(12) United States Patent
Jacobson et al.

(10) Patent No.: US 6,773,490 B2
(45) Date of Patent: Aug. 10, 2004

(54) SULFUR TRIOXIDE DELIVERY SYSTEM

(75) Inventors: Stephen Ernest Jacobson, Princeton, NJ (US); Howard M. Blank, Wilmington, DE (US); David Richard Corbin, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 90 days.

(21) Appl. No.: 09/848,896

(22) Filed: May 4, 2001

(65) Prior Publication Data

US 2002/0197198 A1 Dec. 26, 2002

(51) Int. Cl.[7] .......................... B01D 59/26; B01D 53/50; C01B 33/12; C01B 39/02
(52) U.S. Cl. .......................... 95/106; 95/137; 423/335; 423/700; 502/60; 502/64; 502/400; 502/517
(58) Field of Search ........................ 423/244.01, 244.11, 423/335, 700, 338; 502/60, 64, 400, 407, 414, 517; 95/137, 106

(56) References Cited

U.S. PATENT DOCUMENTS

| 3,362,786 A | | 1/1968 | Burkhardt ..................... 23/175 |
|---|---|---|---|
| 3,980,454 A | | 9/1976 | Hishinuma et al. ............. 55/73 |
| 4,663,142 A | | 5/1987 | Cameron et al. ............. 423/532 |
| 4,775,587 A | | 10/1988 | Walles ..................... 428/305.5 |
| 5,223,237 A | * | 6/1993 | Simpson et al. ....... 423/244.11 |
| 5,233,081 A | | 8/1993 | Walles ......................... 562/75 |
| 5,426,083 A | | 6/1995 | Bhattacharyya et al. .... 502/411 |
| 5,447,701 A | * | 9/1995 | Inoue et al. ................. 423/224 |
| 5,591,418 A | | 1/1997 | Bhattacharyya et al. . 423/239.1 |
| 5,647,903 A | * | 7/1997 | McGill et al. ............... 423/338 |
| 5,763,016 A | | 6/1998 | Levenson et al. ............ 427/510 |
| 6,168,773 B1 | * | 1/2001 | Sharp .......................... 423/338 |

FOREIGN PATENT DOCUMENTS

| EP | 0514941 A | 11/1992 |
|---|---|---|
| SU | 226567 | 1/1971 |

OTHER PUBLICATIONS

S.C. Zwetkov, "Adsorption Von SO3 Auf Saeuremodifiziertem Bentonit", Chemische Technik, Leipzig, DE, vol. 47, No. 5, Oct. 1995, pp. 252–254, XP008005213.

N.V. Kel Tsev et al, "Chemisorption of Sulphur Trioxide on Silica Gel", Russian Journal of Physical Chemistry, Chemical Society, London, GB, vol. 44, No. 6, 1970, pp. 1592–1594, XP008005214, no date.

S. Tsvetkov and Yu. Shumyatskii, "Behavior of Sulfur Oxides in Absorption on Natural Zeolite", Khim.Ind. (Sofia) 59; No. 8:356–9 (1987).

S.A. Anurov, D.A. Lobanov, V.I. Smola, U.I. Shumyatskyi, "Study of Absorption of Sulfur Oxides by Zeolites", Minvuz USSR, Moscow D.I. Mendeleev Institute of Chemical Technology, #3068–83 Den., UDK 66.074, 7:546,224–31:622.367, 1983.

Sh. Minasyan, Yu. I. Shumyatskii, N.V. Kel'Tsev, N.S. Torocheshnikov, "Chemisorption of Sulphur Trioxide on Silica Gel", Zh. Fiz. Khim (1970), 44(12), 3136–9.

S.A. Anurov, M.G. Voronina, D.A. Lobanov, "Cyclic Operation of Mordenites During Elimination of Oxides of Sulfur From Gases", All Union Institute of Scientific and Technical Information; Article No. 5094–83 Dep., pp. 1–13.

(List continued on next page.)

Primary Examiner—Wayne A. Langel

(57) ABSTRACT

A process for reversible sorption of sulfur trioxide onto a sorbent comprising a) contacting from about 15% to 100% sulfur trioxide with the sorbent under anhydrous conditions at a temperature of from about 35° C. to about 150° C. thereby sorbing the sulfur trioxide onto the sorbent, b) desorbing sulfur trioxide from the sorbent at a temperature of from about 150° C. to about 350° C. at about atmospheric pressure, or under a vacuum pressure, and c) recycling said sorbent by continuously repeating steps a) and b), wherein said sorbent consists essentially of silica or zeolite having a silicon to aluminum ratio in the ranges of from about 1 to about 4.4 or greater than about 5.1, and having a pore size of at least 0.5 nm is disclosed.

9 Claims, 1 Drawing Sheet

OTHER PUBLICATIONS

S.Ch. Zwetkov, "Adsorption of $SO_3$ on Acid–Modified Bentonite", A Communication from the School of Advanced Mining and Geology, Sofia, Bulgaria, Chem. Technik 47 yr., vol. 5, Oct., 1995, pp. 1–7.

R. Szostak, "Molecular Sieves Principles of Synthesis and Identification", Van Nostrand Reinhold Catalysis Series, Library of Congress Catalog Card No. 88–5608, ISBN 0–442–28023–8, 1989, pp. 1–51.

* cited by examiner

SULFUR TRIOXIDE DELIVERY SYSTEM

FIELD OF THE INVENTION

The present invention relates to a process for the reversible sorption of sulfur trioxide on a recyclable sorbent, and to the composition of sorbent and sulfur trioxide.

BACKGROUND OF THE INVENTION

Today the major uses of sulfur trioxide are in sulfonations and the manufacture of explosives. A more recent and relatively smaller volume use is in the electronics industry where very pure sulfur trioxide can be used for etching of electronics parts. Levenson and Waleh describe this application in U.S. Pat. No. 5,763,016, where exposure of the electronics parts at room temperature to 400° C. to dry gaseous sulfur trioxide is used to etch organic coatings, films, and layers, including photoresists. In this application, the delivery of small quantities of pure sulfur trioxide is necessary. The electronics industry is typically not equipped to handle sulfur trioxide in bulk liquid form, or the consequences of safety incidents with bulk quantities of such a toxic and corrosive in gas or liquid form.

Liquid sulfur trioxide should be stored at a fairly precise temperature range of 35–41° C. to maintain a liquid state and keep it from freezing. Also, to avoid the formation of alpha and beta forms, it is necessary to store the sulfur trioxide in the presence of a polymerization inhibitor. Temperatures of 35–41° C. result in a significant sulfur trioxide vapor pressure and thus require storage in a pressure vessel. If sulfur trioxide were sorbed on a substrate, it could be stored under an inert atmosphere at room temperature in a non-pressure container made of a suitable material such as stainless steel or glass. No inhibitor would be required to prevent polymerization.

Tsvetkov, et al., in Khim. Ind. (Sofia) (1987), 59(8), 356–9, Chem. Tech. (Leipzig) (1995), 47(5), 252–4, and Deposited Doc (1983), Issue VINITI, pp. 2873–2880 (1980) describe the sorption of sulfur oxides on acid-modified natural bentonite and on the natural zeolites mordenite and clinoptilolite (having a $SiO_2/Al_2O_3$ ratio corresponding to a Si/Al ratio equal to 4.5–5.025). They noted the catalytic effect on conversion of sulfur dioxide to sulfur trioxide and that desorption of sulfur trioxide formed in the sorbent was reversible and not accompanied by chemical transformations. Sorption capacity fell by 20–30% in the first 7–8 cycles in the bentonite example. Kel'tsev et al. (Russian J. Phys. Chem. 44(6), 1592–1594, 1970) describe the sorption of sulfur trioxide by hydroxylated and dehydroxylated silica gel.

Typically, the cyclic sorption of sulfur trioxide by acidic zeolites such as mordenite deal with zeolites that require relatively high temperatures of greater than 400° C. for complete desorption. They show a pronounced decrease in activity after several cycles.

It is desirable to have sulfur trioxide in a safer and more easily used form, such as reversibly sorbed on a substrate that allows easy desorption at lower temperatures and thus simple delivery of the sulfur trioxide. Also, it is desirable to have the sorbed sulfur trioxide in an easily flowable form, for instance as free-flowing pellets, available in a commercial quality (typically 98% minimum) for conventional uses or in a highly purified quality for use in the electronics industry (typically 99.9%). The desorbed sulfur trioxide should be no lower in purity than the sulfur trioxide feedstock. Furthermore, it is desirable for the sorbent to be reusable. The present invention provides such an sorbent and a process for its use.

SUMMARY OF THE INVENTION

The present invention comprises a process for reversible sorption of sulfur trioxide onto a sorbent comprising a) contacting from about 15% to 100% sulfur trioxide with the sorbent under anhydrous conditions at a temperature of from about 35° C. to about 150° C. thereby sorbing the sulfur trioxide onto the sorbent, b) desorbing sulfur trioxide from the sorbent at a temperature of from about 150° C. to about 350° C. at about atmospheric pressure, or under a vacuum pressure, and c) recycling said sorbent by continuously repeating steps a) and b), wherein said sorbent has a pore size of at least 0.5 nm and consists essentially of silica or zeolite, said zeolite having a silicon to aluminum ratio in the ranges of from about 1 to about 4.4 or greater than about 5.1.

The present invention further comprises a sorbent consisting essentially of silica or zeolite, said zeolite having a silicon to aluminum ratio in the ranges of from about 1 to about 4.4 or greater than about 5.1, said sorbent having a pore size of at least 0.5 nm, and having adsorbed thereon a minimum of about 1% by weight sulfur trioxide.

DETAILED DESCRIPTION

Figure 1:
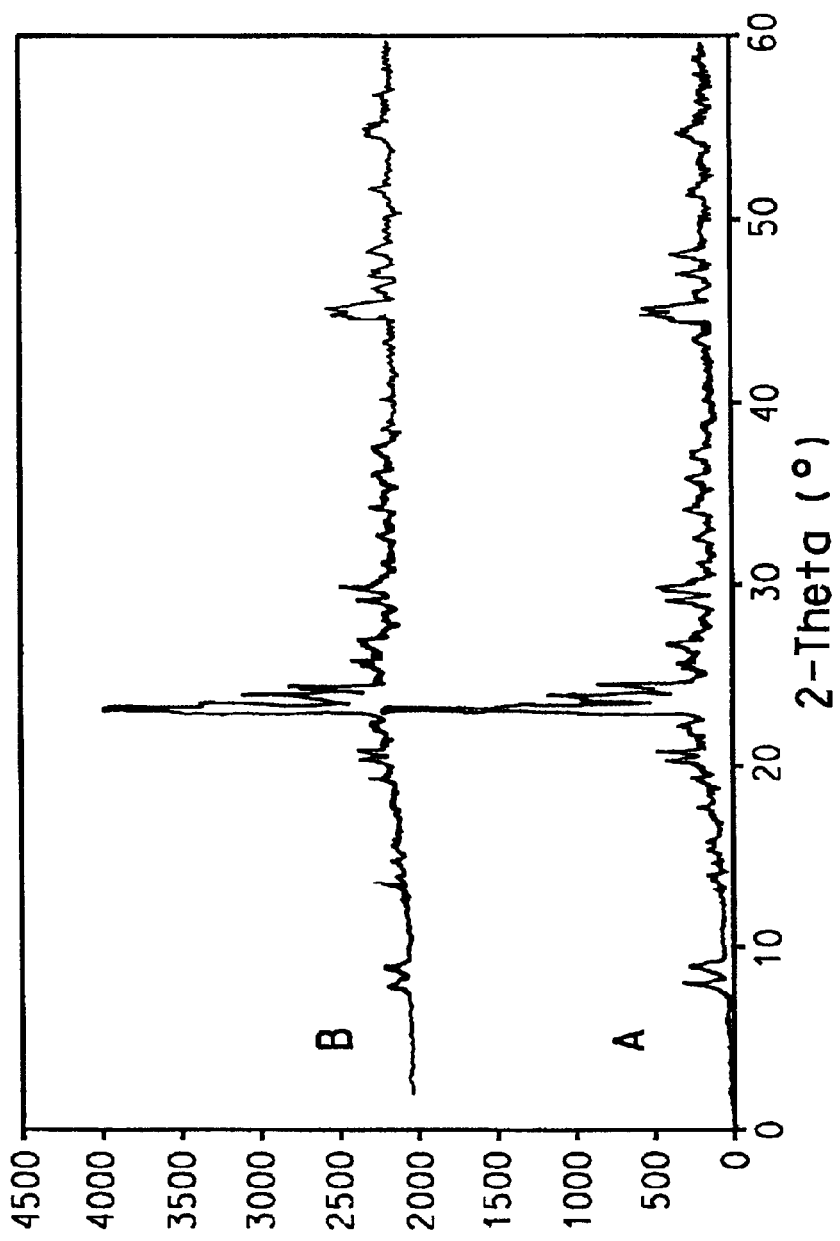
FIG. 1 shows X-ray spectra of an example sorbent before the first sulfur trioxide sorption (denoted as "A") and after ten sulfur trioxide sorption and desorption cycles (denoted as "B"). Units of intensity on the ordinate are counts and the 2-theta abscissa is the scattering angle in degrees.

The present invention comprises a process for the reversible sorption and desorption of sulfur trioxide onto certain molecular sieves or sorbents with recycle of the sorbent. This process is used to provide the composition of the present invention, sorbent having sulfur trioxide sorbed thereon, to an end user requiring a source of sulfur trioxide. Thus, the present invention further comprises a sorbent having a pore size of at least 5 nm, and comprising a silicon or zeolite, said zeolite having a silica to aluminum ratio of from about 1 to about 4.4 or about 5.1 or greater, said sorbent having adsorbed thereon a minimum of about 1% by weight sulfur trioxide. When charged, the sorbent contains from about 3% to about 60% by weight sorbed sulfur trioxide, preferably from about 10% to about 45% by weight sorbed sulfur trioxide, and most preferably from about 15% to about 45% by weight sorbed sulfur trioxide. The sulfur trioxide, sorbed on the sorbent, and in a suitable container, is readily desorbed. It exhibits substantially reduced hazards in transportation and use.

By the term "sorbed" as applied to the process and composition of this invention is meant a composition of substrate and sulfur trioxide exhibiting a partial vapor pressure of sulfur trioxide less that that of sulfur trioxide itself, e.g., at 24° C. a partial vapor pressure of less than 0.3 atmosphere (29 kPa).

The composition of the present invention is prepared by step a) of the process of the present invention. Sulfur trioxide, of purity from about 98% to 100%, is sorbed onto a sorbent. Any source of sulfur trioxide of adequate purity for the intended end-use may be used, typically a container of pure liquid sulfur trioxide is used. The sulfur trioxide, as vapor or liquid, is passed through a bed of the dried sorbent to generate the sorbent/sulfur trioxide composition of this invention at a temperature in the range of from about 35 to about 150° C., preferably from about 50 to about 125° C., and most preferably in the range of from about 70 to about 100° C. The sorbent container optionally may be heated up to about 150° C. during the sorption or optionally heated and then cooled to increase sorption. The sorbent is contained in any suitable container inert to sulfur trioxide and suitable for the intended desorption temperatures. Materials of construction for containing sulfur trioxide are well known to those skilled in the art. Steel or stainless steel cylinders, which may be lined with an inert lining such as poly (tetrafluoroethylene), are preferred. Optionally an inert carrier gas may be used to move the sulfur trioxide into the sorbent. In a typical sorption step, for example, dry nitrogen may be passed through liquid sulfur trioxide maintained at 35° C. to provide a gas stream containing about 50% by volume of sulfur trioxide. The sulfur trioxide concentration in the feed stream during the sorption step is preferably at least 15% by volume, the remainder being the inert carrier gas.

By the term "inert carrier gas" is meant a gas that is unreactive with sulfur trioxide, sorbent, or container, and is typically dry nitrogen. When an inert carrier gas is used, the purity of the sulfur trioxide is described exclusive of the carrier gas. Optionally the sulfur trioxide stream can be sorbed under a positive pressure to accelerate sorption.

The present invention uses thermally stable and dry sorbents such as silicalites, zeolites, clays, and silicas to provide long-term cyclability while allowing the sulfur trioxide to be expelled at relatively low temperatures, up to about 350° C. For example, X-ray spectra of the H-ZSM-5 extrudates as used in Example 21 are shown in FIG. 1 prior to the first sorption of sulfur trioxide ("Unused" trace, denoted as "A") and again after ten sorption and desorption cycles ("After 10 Cycles" trace, denoted as "B"). The latter trace has been displaced upward by 2000 intensity units so that the traces can be distinguished. The two traces are essentially unchanged, indicating no deterioration of the sorbent molecular structure. Zeolites with a low Si/Al ratio (high in $Al_2O_3$) are prone to structural degradation after sulfur trioxide sorption and desorption, particularly at higher temperatures. Such structure degradation results in an irreversible loss of sorption capacity for sulfur trioxide, and the structural changes result in the appearance of a broad peak in the 2-theta range 15–30°. Appearance of a broad peak is clearly absent in the "After 10 Cycles" trace B in FIG. 1.

Molecular sieves, both natural and synthetic, are well known in the art and are defined in R. Szostak, Molecular Sieves—Principles of Synthesis and Identification, Van Nostrand Reinhold, page 2 (1989). The inorganic molecular sieves used for sorbing and desorbing sulfur trioxide in accordance with this invention include various silicates (e.g., titanosilicates, borosilicates, silicalites, low alumina-containing zeolites such as mordenite and ZSM-5, and high alumina-containing zeolites such as 5A, NaY and 13X). The preferred molecular sieves useful as sorbents in the invention are either acidic or are non-acidic silicates.

Zeolites can be generically described as complex aluminosilicates characterized by a three-dimensional framework structure enclosing cavities occupied by ions and water molecules, all of which can move with significant freedom within the zeolite matrix. In commercially useful zeolites, the water molecules can be removed from or replaced within the framework without destroying its structure. Zeolites can be represented by the following formula: $M_{2/n}O \cdot Al_2O_3 \cdot xSiO_2 \cdot yH_2O$, wherein M is a cation of valence n, x is greater than or equal to 2, and y is a number determined by the porosity and the hydration state of the zeolite, generally from 0 to 8. In naturally occurring zeolites, M is principally represented by Na, Ca, K, Mg and Ba in proportions usually reflecting their approximate geochemical abundance. The cations M are loosely bound to the structure and can frequently be completely or partially replaced with other cations or hydrogen by conventional ion exchange.

The zeolite structure is a corner-linked tetrahedra with Al or Si atoms at centers of tetrahedra and oxygen atoms at corners. Such tetrahedra are combined in a well-defined repeating structure comprising various combinations of 4-, 6-, 8-, 10-, and 12-membered rings. The resulting framework is one of regular channels and cages, which impart a useful pore structure for separation. Pore dimensions are determined by the geometry of the aluminosilicate tetrahedra forming the zeolite channels or cages, with nominal openings of 0.26 nm for 6 rings, 0.40 nm for 8 rings, 0.55 μm for 10 rings and 0.74 nm for 12 rings (these numbers assume ionic radii for oxygen). Those skilled in the art will recognize that zeolites with the largest pores being 8 rings, 10 rings, and 12 rings are considered small, medium, and large pore zeolites, respectively. Pore dimensions are critical to the performance of these materials in catalytic and separation applications, since this characteristic determines whether reactant molecules can enter and product molecules (in the catalytic application case) can exit the zeolite framework. In practice, it has been observed that very slight decreases in ring dimensions can effectively hinder or block movement of particular reactants or catalysis products within a zeolite structure.

The pore dimensions that control access to the interior of the zeolite are determined not only by the tetrahedra forming the pore opening, but also by the presence or absence of ions in or near the pore. In the case of zeolite A, for example, access can be restricted by monovalent ions, such as $Na^+$ or $K^+$, which are situated in or near 8-ring openings as well as 6-ring openings. Access is enhanced by divalent ions, such as $Ca^{2+}$, which are situated only in or near 6-ring openings. Thus, the potassium and sodium salts of zeolite A exhibit effective pore openings of about 0.3 nm and 0.4 nm respectively, whereas the calcium salt of zeolite A has an effective pore opening of 0.5 nm. For this application it is important that the pore opening be of sufficient size (at least 0.5 nm) to allow the ingress and egress of sulfur trioxide. The presence or absence of ions in or near the pores, channels, and/or cages can also significantly modify the accessible pore volume of the zeolite for sorbing materials. To maximize capacity, generally protons or small cations are preferred.

Zeolites are available from various sources. A comprehensive listing of zeolites vendors is contained in "CEH Marketing Research Report: Zeolites" by M. Smart and T. Esker with A. Leder and K. Sakota, 1999, Chemical Economics Handbook-SRI International.

Low alumina-containing zeolites can be prepared synthetically (e.g., mordenite, ZSM-5, silicalite) or by modification of high alumina-containing zeolites using methods well known in the art. These methods include but are not limited by treatment using $SiCl_4$ or $(NH_4)_2SiF_6$ as well as steaming followed by acid treatment. The $SiCl_4$ treatment is described in J. Chem. Ed. 67(6), 519–521, 1990. The $(NH_4)_2SiF_6$ treatment by Breck et al., is described in U.S. Pat. No. 4,503,023. These treatments are generally very effective at increasing the Si/Al ratio for zeolites such as zeolites Y and mordenite.

Acid forms of molecular sieve sorbents can be prepared by a variety of techniques including ammonium exchange followed by calcination or by direct exchange of alkali ions for protons using mineral acids or ion exchangers (for a discussion of acid sites in zeolites see J. Dwyer, "Zeolite, Structure, Composition and Catalysis" in Chemistry and Industry, Apr., 2, 1984). Binders for molecular sieve particles may be used as long as they do not affect the molecular sieve's ability to sorb and desorb sulfur trioxide.

The silicalites, zeolites (aluminosilicates), titanosilicates, aluminophosphates, silicas, clays, and borosilicates are all suitable for use as sorbents in the present invention. Examples of suitable silicalites are silicalite-1 and silicalite-2. Examples of suitable zeolites (aluminosilicates) are mordenite, Y, X, 5A, US-Y, DA-Y, ZSM-5, ZSM-11, beta, L, ferrierite, and clinoptilolite. Examples of suitable titanosilicates are TS-1, TS-2, and Ti-beta. Examples of suitable clays are bentonite, montmorillonite, kaolin, and talc. Examples of suitable borosilicates are boralite-A, boralite-B, boralite-C, and boralite-D. Examples of suitable aluminophosphates are $AlPO_4-5$, $SAPO-5$, $AlPO_4-11$, $SAPO-34$, and so on. Silicas include precipitated silica, dried silica sols, diatomaceous earth, silica gels, and fumed silicas. Preferred sorbent materials include high surface area silicas and the high silica-containing molecular sieve materials (Si/Al greater than about 5.1) prepared either by synthesis or modification. These materials include silicalite, mordenite, beta, US-Y, DA-Y, ZSM-5, ZSM-11, borosilicates, titanosilicates and the like. The most preferred sorbent materials have a Si/Al ratio of at least about 25. Sorbent materials with Si/Al ratios in the range from about 1 to about 4.4 can also be used, but are less preferred as the sulfur trioxide/sorbent structure becomes less structurally stable to higher temperatures as this ratio decreases. The amount of sulfur trioxide sorbed is at least about 1%, preferably at least about 3%, and most preferably at least about 5% by weight, based on the weight of the sorbent. The maximum amount sorbed is dependent upon the physical structure of the sorbent used, typically in the range from about 40% to about 60% based on the weight of the sorbent.

Additionally and preferably, the sorbent is used in a pelletized, beaded, or extruded and chopped form to facilitate gas or liquid flow through the sorbent bed. The typically powdered sorbent may be pelletized using suitable binder. Binders must be stable to exposure to sulfur trioxide and the sorption/desorption conditions. Gamma-alumina, silica, and clays are examples of suitable binders. The pelletization of such sorbents is well known to those skilled in the art and provides pellets that remain free flowing after repeated sorption and desorption cycles.

The use of the present invention is not limited to the supply of pure sulfur trioxide for such specialized applications as etching for the electronics industry. Larger volume conventional users of sulfur trioxide, such as in sulfonations, must manage the hazards presented by bulk storage of sulfur trioxide. The sorbed sulfur trioxide composition of the present invention provides a major hazards management method for all users.

Typical specifications for the sulfur trioxide feed during the sorption step has a sulfur trioxide content equal or greater than 99.5% and preferably equal or greater than 99.9%. The sulfur trioxide feed contains equal or less than 0.4% by weight sulfuric acid and preferably equal or less than 0.1%, and has an iron (measured as Fe) concentration of less than 5 parts per million by weight (ppm) and preferably equal or less than 0.7 ppm. Desorbed sulfur trioxide quality corresponds to the quality of the sorbed sulfur trioxide.

In the process of this invention, the sorbent/sulfur trioxide composition can be stored indefinitely and transported under ambient temperature conditions in a dry container of inert materials of construction as described above.

At a site requiring the safe delivery of small amounts of sulfur trioxide, a container holding the sorbent/sulfur trioxide composition is subjected to 1) controlled heating (at from about 150 to about 350° C., termed heat-assisted desorption) and/or 2) vacuum pressures down to about 100 mm (13 kPa), (termed vacuum-assisted desorption) to provide a source of pure sulfur trioxide. Temperatures are given for heat-assisted desorption at, or close to, atmospheric pressure. Temperatures for vacuum-assisted desorption are correspondingly lower. When the sorbed sulfur trioxide is depleted, as indicated by cessation of the flow of sulfur trioxide, the depleted sorbent is then be recharged with pure sulfur trioxide and thus recycled. Desorption may be facilitated by desorption at reduced pressure, use of an inert carrier gas, or both. Various methods for controlled heating may be used, such as ovens, heating jackets, or the heat may be supplied by using a heated inert gas carrier and insulating the container.

In a typical application the initial charging of sulfur trioxide onto the sorbent and subsequent recharging is preferably performed by a provider at a site equipped for the safe handling of bulk quantities of sulfur trioxide. The user, on the other hand, receives suitable containers, e.g., cylinders, of the charged sulfur trioxide-sorbent into the appropriate reaction area, where the container is heated and can be subjected to vacuum to desorb pure sulfur trioxide as required. The user then recycles the sorbent to the provider. The user is thereby relieved of the problems of safe handling of bulk sulfur trioxide.

EXAMPLES

Examples 1–16 and Comparative Example A demonstrate the sorption of sulfur trioxide with various sorbents. Thermogravimetric analysis was used to characterize desorption from low temperature sites (where desorption occurs at less than 350° C.) and total of low and high temperature sites (where desorption occurs at less than 750° C.). Such characterization distinguishes the more useful and practical sites (where heat-assisted desorption occurs at less than 350° C.) from those that have a significant part of the sulfur trioxide sorbed on high temperature sites (where heat-assisted desorption occurs at 350–750° C.). In most applications, only the low temperature sites (less than 350° C.) will be used to minimize hazards and facilitate handling. Sulfur trioxide bound at the higher temperature sites remains on the support. It should be noted that the thermogravimetric analysis procedure used in these small scale evaluations does not provide particularly accurate or consistent weight changes during desorption due to such factors as variable moisture sorption as the charged sorbent sample is prepared.

Examples 17 and 18 demonstrate the process of repeated sorption and desorption cycles. Examples 17 and 18 are on a larger scale and desorption does not involve exposure of the charged sorbent to ambient conditions. Thus weight changes in Examples 17 and 18 are indicative of the sorption and desorption capacity for sulfur trioxide.

Example 1

A sample of 5A powder (Molecular Sieve Type 5A, from Linde Division of Union Carbide, New York N.Y.) was calcined in air by raising the temperature 60° C. per hour to 500° C. and holding at 500° C. for 5 hours. The sample was cooled to 110° C. and transferred to a dried vial. A poly (tetrafluoroethylene) vessel was loaded with 0.53 g of the dried 5A powder and heated to approximately 60° C. Distilled sulfur trioxide vapor (44–45° C.) was purged over the solid for 10 minutes. The solid was then heated to 91° C. under a dry nitrogen purge for 1.25 h to remove surface bound sulfur trioxide. The sample was rapidly cooled to room temperature. The next day nitrogen flow was restarted and the system heated to 94° C. for 45 minutes at which time there was no apparent fuming observed in the scrubber unit. A sample of the 5A/sulfur trioxide complex was then transferred under anhydrous conditions to a thermogravimetric analyzer where it lost 24.21% of its weight between room temperature and 350° C. and 54.81% between room temperature and 750° C. under flowing nitrogen.

Example 2

A sample of 13x powder (13x, Lot number 01820CY, Aldrich Chemical, Milwaukee Wis.) was calcined in air by raising the temperature 60° C. per hour to 500° C. and holding at 500° C. for 5 hours. The sample was cooled to 110° C. and transferred to a dried vial. A poly(tetrafluoroethylene) vessel was loaded with 0.58 g of the dried 13x powder and heated to approximately 60° C. Distilled sulfur trioxide vapor (about 45° C.) was purged over the solid for 10 minutes. The solid was then heated to about 90° C. under a dry nitrogen purge for 3.5 h to remove surface bound sulfur trioxide. A sample of the 13x/sulfur trioxide complex was then transferred under anhydrous conditions to a thermogravimetric analyzer where it on average lost 29.56% of its weight between room temperature and 350° C. and 56.32% between room temperature and 750° C. under flowing nitrogen.

Example 3

A sample of 13x powder (13x, Lot number 01820CY, see Example 2) was calcined in air by raising the temperature 60° C. per hour to 500° C. and holding at 500° C. for 5 hours. The sample was cooled to 110° C. and transferred to a dried vial. A poly(tetrafluoroethylene) vessel was loaded with 0.51 g of the dried 13x powder and heated to approximately 60° C. Distilled sulfur trioxide vapor (about 45° C.) was purged over the solid for 10 minutes. The solid was then heated to about 90° C. under a dry nitrogen purge for 3.67 h to remove surface bound sulfur trioxide. A sample of the 13x/sulfur trioxide complex was then transferred under anhydrous conditions to a thermogravimetric analyzer where it on average lost 27.60% of its weight between room temperature and 350° C. and 55.14% between room temperature and 750° C. under flowing nitrogen.

Example 4

A 20 g sample of silicalite powder (S-115, from Union Carbide, New York, N.Y.) was placed in a quartz tube in a vertically mounted tube furnace, heated by raising the temperature 60° C. per hour to 500° C. and holding at 500° C. for 5 hours under flowing nitrogen. The sample was cooled under flowing nitrogen and then transferred to a dry box. A poly(tetrafluoroethylene) vessel was loaded with 1 g of the dried silicalite powder and heated to 60° C. Distilled sulfur trioxide vapor (44° C.) was purged over the solid for 1.25 hour. The solid was then heated to 78° C. under a dry nitrogen purge for 11.5 h to remove surface bound sulfur trioxide. The final weight of the silicalite/sulfur trioxide complex was 1.34 g (34.00% weight gain, 25.37% sulfur trioxide loading). The silcalite/sulfur trioxide complex was then transferred under anhydrous conditions to the thermogravimetric analyzer where it on average lost 30.16% of its weight between room temperature and 350° C. and 30.00% between room temperature and 750° C.

Example 5

A 20 g sample of silicalite beads (S-115, see Example 4) was placed in a quartz tube in a vertically mounted tube furnace, heated by raising the temperature 60° C. per hour to 500° C. and holding at 500° C. for 5 hours under flowing nitrogen. The sample was cooled under flowing nitrogen and then transferred to a dry box. A poly(tetrafluoroethylene) vessel was loaded with 3.07 g of the dried silicalite beads. Ten drops of distilled sulfur trioxide liquid was added to the solid at 35° C. The solid was heated to approximately 40° C. under a dry nitrogen purge for approximately 2 h and then heated to 60° C. for 4.25 h to remove surface bound sulfur trioxide. The sample was cooled to room temperature overnight. Heating at 60° C. was resumed the following day for approximately 7.5 h until fuming in the scrubber was minimized. The final weight of the silicalite/sulfur trioxide complex was 3.61 g (17.59% weight gain, 14.96% sulfur trioxide loading). The complex was then transferred under anhydrous conditions to the thermogravimetric analyzer where the average weight loss was 11.39% of its weight between room temperature and 350° C. and 13.76% between room temperature and 750° C.

Example 6

A 20 g sample of NH4-mordenite (Si/Al=15, Valfor CBV-30A, Lot Number 30A-HM-6, PQ Corp., Valley Forge Pa.) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 1.00 g of resulting dried H-Mordenite (Si/Al=15) powder was heated to about 60° C. and distilled sulfur trioxide vapor (about 44° C.) was purged over the solid for 1.25 hours. The solid was then heated to 78° C. under a dry nitrogen purge for 7.65 h to remove surface bound sulfur trioxide. The final weight of the H-Mordenite (Si/Al=15)/sulfur trioxide complex was 1.12 g (12% weight gain, 9.71% sulfur trioxide loading). The H-Mordenite (Si/Al=15)/sulfur trioxide complex was then transferred under anhydrous conditions to the thermogravimetric analyzer where the average weight loss was 17.91% of its weight between room temperature and 350° C. and 27.50% between room temperature and 750° C.

Example 7

A 20 g sample of DAY (Si/Al=55) (DAY-55, Lot Number TC133, Degussa Corp., Frankfurt, Germany and South Plainfield N.J.) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 1.02 g of dried DAY (Si/Al=55) powder was heated to about 66° C. and distilled sulfur trioxide vapor (about 44° C.) was purged over the solid for 2 hours. The solid was then heated to 81° C. under a dry nitrogen purge for 8.3 h to remove surface bound sulfur trioxide. The final weight of the DAY (Si/Al=55)/sulfur trioxide complex was 1.20 g (17.65% weight gain, 13.71% sulfur trioxide loading). The DAY (Si/Al=55)/sulfur trioxide complex was then transferred under anhydrous conditions to the thermogravimetric analyzer where the average weight loss was 23.48% of its weight between room temperature and 350° C. and 27.63% between room temperature and 750° C.

Example 8

A 20 g sample of NH4-mordenite (Si/Al=45) (CBV-90A, Lot Number 1822-42, Zeolyst Corp., Valley Forge Pa.) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 1.03 g of the resulting dried H-mordenite (Si/Al=45) powder was heated to about 64° C. and distilled sulfur trioxide vapor (about 44° C.) was purged over the solid for 1.25 hours. The solid was then heated to 73° C. under a dry nitrogen purge for 3.8 h to remove surface bound sulfur trioxide. The final weight of the H-mordenite (Si/Al=45)/sulfur trioxide complex was 1.69 g (64.08% weight gain, 36.92% sulfur trioxide loading). The H-mordenite (Si/Al=45)/sulfur trioxide complex was then transferred under anhydrous conditions to the thermogravimetric analyzer where the average weight loss was 33.31% of its weight between room temperature and 350° C. and 39.67% between room temperature and 750° C.

Example 9

A 20 g sample of silica gel (powder, 952-08-5×1950, Davison Division of W. R. Grace, Baltimore Md.) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 1.01 g dried silica gel was heated to about 60° C. and distilled sulfur trioxide vapor (about 44° C.) was purged over the solid for 1.25 hours. The solid was then heated to 78° C. under a dry nitrogen purge for 4.85 h to remove surface bound sulfur trioxide. The final weight of the silica gel/sulfur trioxide complex was 1.69 g (67.33% weight gain, 38.84% sulfur trioxide loading). The silica gel/sulfur trioxide complex was then transferred under anhydrous conditions to the thermogravimetric analyzer where the average weight loss was 44.79% of its weight between room temperature and 350° C. and 45.92% between room temperature and 750° C.

Example 10

A 20 g sample of silica gel (powder, 952-08-5×1950, Davison Division of W. R. Grace, Baltimore Md.) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 1.00 g dried silica gel was heated to about 63° C. and distilled sulfur trioxide vapor (about 45° C.) was purged over the solid for 1.25 hours. The solid was then heated to 73° C. under a dry nitrogen purge for 4.6 h to remove surface bound sulfur trioxide. The final weight of the silica gel/sulfur trioxide complex was 1.36 g (36% weight gain, 25.47% sulfur trioxide loading). The silica gel/sulfur trioxide complex was then transferred under anhydrous conditions to the thermogravimetric analyzer where the average weight loss was 30.52% of its weight between room temperature and 350°.

Example 11

A 20 g sample of silica gel (powder, 952-08-5×1950, Davison Division of W. R. Grace, Baltimore Md.) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 1.00 g dried silica gel was heated to about 62° C. and distilled sulfur trioxide vapor (about 47° C.) was purged over the solid for 1.25 hours. The solid was then heated to 79° C. under a dry nitrogen purge for 3.2 h to remove surface bound sulfur trioxide. The final weight of the silica gel/sulfur trioxide complex was 1.56 g (56% weight gain, 35.9% sulfur trioxide loading). The silica gel/sulfur trioxide complex was then transferred under anhydrous conditions to the thermogravimetric analyzer where the average weight loss was 21.25% of its weight between room temperature and 350°.

Example 12

A 20 g sample of silica gel (powder, 952-08-5×1950, Davison Division of W. R. Grace, Baltimore Md.) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 3.01 g dried silica gel was heated to about 57° C. and distilled sulfur trioxide vapor (about 36° C.) was purged over the solid for 1 hour. The solid was then heated to 64° C. under a dry nitrogen purge for 2.4 h to remove surface bound sulfur trioxide. The final weight of the silica gel/sulfur trioxide complex was 3.51 g (16.61% weight gain, 14.25% sulfur trioxide loading). The silica gel/sulfur trioxide complex was then transferred under anhydrous conditions to the thermogravimetric analyzer where the average weight loss was 13.55% of its weight between room temperature and 350°.

Example 13

M-5 (Lot Number 962483061001-S-10, UOP Corp., Des Plaines Ill.) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 1.00 g of resulting dried Na-Mordenite (Si/Al=5.35) powder was heated to about 60° C. and distilled sulfur trioxide vapor (about 47° C.) was purged over the solid for 0.17 hours. The solid was then heated to 90° C. under a dry nitrogen purge for 4.9 h to remove surface bound sulfur trioxide. The final weight of the Na-Mordenite (Si/Al=5.35)/sulfur trioxide complex was 1.22 g (22% weight gain, 17.03% sulfur trioxide loading). The Na-Mordenite (Si/Al=5.35)/sulfur trioxide complex was then transferred under anhydrous conditions to the thermogravimetric analyzer where the average weight loss was 13.10% of its weight between room temperature and 350° C. and 22.16% between room temperature and 750° C.

Example 14

A 15 g sample of Na-mordenite (Si/Al=5.35) (LZ-M-5, Lot Number 962483061001-S-10, UOP Corp., Des Plaines Ill.) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 1.00 g of resulting dried Na-Mordenite (Si/Al=5.35) powder was heated to about 60° C. and distilled sulfur trioxide vapor (about 45° C.) was purged over the solid for 1 hour. The solid was then heated to 38° C. under a dry nitrogen purge for 6.6 h to remove surface bound sulfur trioxide. The final weight of the Na-Mordenite (Si/Al=5.35)/sulfur trioxide complex was 1.37 g (37% weight gain, 26.01% sulfur trioxide loading). The Na-Mordenite (Si/Al=5.35)/sulfur trioxide complex was then transferred under anhydrous conditions to the thermogravimetric analyzer where the average weight loss was 30.67% of its weight between room temperature and 350° C. and 40.20% between room temperature and 750° C.

Example 15

A 20 g sample of US-Y (Si/Al=2.8) (LZ-20, Lot Number 15228-65, UOP Corp., Des Plaines Ill.) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 1.00 g of resulting dried US-Y (Si/Al=2.8) powder was heated to about 60° C. and distilled sulfur trioxide vapor (about 45° C.) was purged over the solid for 1.25 hours. The solid was then heated to 86° C. under a dry nitrogen purge for 12.45 h to remove surface bound sulfur trioxide. The final weight of US-Y (Si/Al=2.8)/sulfur trioxide complex was 1.26 g (26% weight gain, 19.63% sulfur trioxide loading). The US-Y (Si/Al=2.8)/sulfur trioxide complex was then transferred under anhydrous conditions to the thermogravimetric analyzer where the average weight loss was 14.05% of its weight between room temperature and 350° C. and 37.70% between room temperature and 750° C.

Example 16

A 9.12 g sample of FCC catalyst (Super Nova D, W. R. Grace Co., Baltimore Md.) was placed in a quartz tube in a vertically mounted tube furnace, heated by raising the temperature 60° C. per hour to 550° C. and holding at 500° C. for 5 hours under flowing nitrogen. A poly(tetrafluoroethylene) vessel containing 2.03 g of resulting dried FCC powder was heated to about 35° C. and distilled sulfur trioxide vapor (about 45° C.) was purged over the solid for 1 hour. The solid was then heated to about 83° C. under a dry nitrogen purge for 3.5 h to remove surface bound sulfur trioxide. The final weight of FCC/sulfur trioxide complex was 2.54 g (25.12% weight gain, 20.08% sulfur trioxide loading). The FCC/sulfur trioxide complex was then transferred under anhydrous conditions to the thermogravimetric analyzer where the average weight loss was 1.33% of its weight between room temperature and 350C and 9.97% between room temperature and 750° C.

Example 17

A sample (100 g) of silica gel powder (Lot number 952-08-5×1950, Davison Division, W. R. Grace, Baltimore Md.) was placed in a quartz tube in a vertically mounted tube furnace, heated by raising the temperature 60° C. per hour to 500° C. and holding at 500° C. for 5 hours under flowing nitrogen. The sample was cooled under flowing nitrogen and then transferred to a dry box.

(i). Sorption Cycle

A poly(tetrafluoroethylene) vessel was loaded with 20.0 g of the dried silica gel and heated to approximately 38° C. Distilled sulfur trioxide vapor (about 38° C.) was purged over the solid for 2.67 h. The sample was also shaken for 30 seconds every 10 minutes. The solid was then maintained at 60° C. under a dry nitrogen purge for 4.5 h to remove surface bound sulfur trioxide. The final weight of the silica gel/sulfur trioxide complex was 23.85 g (19.25% weight gain, 16.14% sulfur trioxide loading). A sample of the silica gel/sulfur trioxide complex was then transferred under anhydrous conditions to a thermogravimetric analyzer where it lost 18.69% of its weight between room temperature and 350° C. and 20.21% between room temperature and 750° C. under flowing nitrogen.

(ii). Desorption Cycle

A sample (9.96 g) of the silica gel/sulfur trioxide complex prepared in (i) above was loaded in a drybox into a quartz tube and then placed in a vertically mounted tube furnace. Under flowing nitrogen the material was heated to 350° C. and held for 24 h and then cooled. Effluent gases were passed through aqueous KOH scrubbers to remove sulfur trioxide. The final weight was 8.24 g (17.27% weight loss). A sample of the desorbed silica gel/sulfur trioxide complex was then transferred under anhydrous conditions to a thermogravimetric analyzer where it lost 4.87% of its weight between room temperature and 350° C. and 7.02% between room temperature and 750° C. under flowing nitrogen. The loss to 350° C. is an indication of the effectiveness of the desorption procedure. The loss from 350 to 750° C. is an indication of amounts of "unusable" sulfur trioxide.

The sorption and desorption procedures (i) and (ii) above were repeated a total of 4 cycles. The results are summarized in the Table 1.

The sample from the sorption stage for cycle 4S was affected by high humidity while being transferred to the thermogravimetric analyzer equipment. Thermogravimetric analyses after sorption (1S, 2S, and 3S) typically show negligible weight loss between ambient room temperature and 150° C. Examination of the thermogravimetric analysis results for Sample 4S showed a major weight loss between room temperature and 150° C., attributed to the exposure to humidity. Subtracting this weight loss from the weight loss to 350° C. gives the corrected underscored values in Table 1.

TABLE 1

Results of Sorption and Desorption Cycles

| Cycle/Step[a] | Starting Weight (g) | Final Weight (g) | Weight Gain (Loss)[b] (%) | Weight Gain (Loss)[c] (%) | TGA Loss to 350° C. (%) | TGA Loss to 750° C. (%) | TGA Loss 350°–750° C. |
|---|---|---|---|---|---|---|---|
| 1S | 20.00 | 23.85 | 19.25 | 16.14 | 18.69 | 20.21 | 1.52 |
| 1D | 9.96 | 8.24 | (17.27) | (20.87) | 4.87 | 7.02 | 2.15 |
| 2S | 7.79 | 9.64 | 23.75 | 19.19 | 21.96 | 24.24 | 2.28 |
| 2D | 8.98 | 7.08 | (21.16) | (26.84) | 5.58 | 7.44 | 1.86 |
| 3S | 6.88 | 8.98 | 30.52 | 23.39 | 24.33 | 26.60 | 2.27 |
| 3D | 8.41 | 6.38 | (24.14) | (31.82) | 6.40 | 9.20 | 2.80 |
| 4S | 6.13 | 8.05 | 31.32 | 23.85 | 41.3 | 44.0 | 2.70 |
| Corrected[d] | | | | | 25.6[d] | 28.9[d] | |
| 4D | 7.65 | 5.45 | (28.76) | (40.37) | 5.880 | 9.30 | 3.50 |

[a]S: sorption step; D: desorption step.
[b]Based on starting weight; samples for thermogravimetric analysis (TGA) were removed at each cycle, thus the starting weight necessarily decreases.
[c]Based on final weight.
[d]Underscored values are corrected for humidity exposure during handling, as described at the beginning of this example.

The results in Table 1 illustrate the capacity for repeated sorption and desorption cycles and demonstrate the stability of the silica to such cycles.

Example 18

A sample (80 g) of an extruded H-ZSM-5 (PQ Corp., Valley Forge Pa.), Si/Al=25, 20% alumina binder) was placed in a quartz tube in a vertically mounted tube furnace, heated by raising the temperature 60° C. per hour to 500° C. and holding at 500° C. for 5 hours under flowing nitrogen. The sample was cooled under flowing nitrogen and then transferred to a dry box.

Cycle 1. Adsorption

A poly(tetrafluoroethylene) vessel was loaded with 30.0 g of the dried H-ZSM-5 extrudates and heated to approximately 60° C. Distilled sulfur trioxide vapor (about 38° C.) was purged over the solid for 2 h. The sample was also shaken for 30 seconds every 10 minutes. The solid was then maintained at 60° C. under a dry nitrogen purge for 9.25 h to remove surface bound sulfur trioxide. The final weight of the H-ZSM-5 extrudate/sulfur trioxide complex was 37.25 g (24.17% weight gain, 19.46% sulfur trioxide loading). A sample of the H-ZSM-5 extrudate/sulfur trioxide complex was then transferred under anhydrous conditions to a thermogravimetric analyzer where it on average lost 14.01% of its weight between room temperature and 350° C. and 18.85% between room temperature and 750° C. under flowing nitrogen.

Cycle 1. Desorption

The H-ZSM-5 extrudate/sulfur trioxide complex (30.03 g) was loaded in a drybox into a quartz tube and then placed in a vertically mounted tube furnace. Under flowing nitrogen the material was heated to 350° C. and held for 24 h and then cooled. (Effluent gases were passed through aqueous potassium hydroxide scrubbers to remove sulfur trioxide.) The final weight was 25.48 g (15.09% weight loss). A sample of the desorbed H-ZSM-5 extrudate/sulfur trioxide complex was then transferred under anhydrous conditions to a thermogravimetric analyzer where it on average lost 1.14% of its weight between room temperature and 350° C. and 5.07% between room temperature and 750° C. under flowing nitrogen. (The loss to 350° C. is an indication of the effectiveness of the desorption procedure. The loss from 350 to 750° C. is an indication of amounts of "unusable" sulfur trioxide.)

The adsorption and desorption procedures were repeated a total of 10 cycles. The results are summarized in Table 2 below.

The apparent temporary low capacity in recyle runs 4–6 in Example 21, are due to temperature excursions during the recycle runs. Sulfur trioxide sorption capacity can vary with sorption temperatures as discussed above. Due to a faulty thermocouple and unrelated to the invention, temperatures were less than required during the three specified recycle runs in Example 21, temporarily mimicking a capacity decrease. The thermocouple was replaced in recycle runs 7–10, and sulfur trioxide capacity measurements returned to the initial value.

TABLE 2

Sorption/Desorption Cycles for H-ZSM-5 Extrudates.

| Cycle | Step (1) | Start. Wt. (g) | Final Wt. (g) | Wt. Gain or Loss (2) | Wt. Gain or Loss (3) | Avg. % TGA Loss to 350° C. (4,5) | Avg. % TGA Loss to 750° C. (4,5) | Avg. TGA Loss 350° C. to 750° C. (4,5) |
|---|---|---|---|---|---|---|---|---|
| 1 | A | 30.00 | 37.25 | 24.17 | 19.46 | 13.29 | 18.2 | 4.91 |
| 1 | D | 30.03 | 25.48 | (15.09) | (17.78) | 1.07 | 5.05 | 3.98 |
| 2 | A | 22.15 | 25.29 | 14.20 | 12.43 | 11.10 | 17.29 | 6.19 |
| 2 | D | 23.00 | 20.14 | (12.43) | (14.20) | 1.24 | 5.5 | 4.26 |
| 3 | A | 18.68 | 21.35 | 14.29 | 12.51 | 10.83 | 17.5 | 6.67 |
| 3 | D | 19.46 | 16.95 | (12.90) | (14.81) | 0.85 | 4.6 | 3.75 |
| 4 (6) | A | 16.34 | 18.53 | 13.40 | 11.82 | 11.06 | 16.39 | 5.33 |
| 4 (6) | D | 16.92 | 15.69 | (7.27) | (7.84) | 4.42 | 9.71 | 5.29 |
| 5 (6) | A | 14.81 | 15.69 | 5.94 | 5.61 | 7.30 | 12.84 | 5.54 |
| 5 (6) | D | 14.50 | 13.30 | (8.28) | (9.02) | 2.50 | 6.78 | 4.28 |
| 6 (6) | A | 12.77 | 13.43 | 5.17 | 4.91 | 5.30 | 10.37 | 5.07 |
| 6 (6) | D | 12.02 | 11.47 | (4.58) | (4.80) | 0.83 | 4.91 | 4.08 |
| 7 | A | 10.91 | 13.35 | 22.36 | 18.28 | 18.60 | 24 | 5.40 |
| 7 | D | 11.89 | 10.00 | (15.90) | (18.90) | 1.50 | 5.72 | 4.22 |
| 8 | A | 9.43 | 11.44 | 21.31 | 17.57 | 13.31 | 18.75 | 5.44 |
| 8 | D | 10.17 | 8.60 | (15.44) | (18.26) | 1.24 | 6.58 | 5.34 |
| 9 | A | 8.11 | 9.63 | 18.74 | 15.78 | 11.25 | 17.64 | 6.39 |
| 9 | D | 8.35 | 7.28 | (12.81) | 14.70 | 0.83 | 6.93 | 610 |
| 10 | A | 6.75 | 8.75 | 29.63 | 22.86 | 18.06 | 24.17 | 6.11 |
| 10 | D | 7.50 | 5.99 | (20.13) | (25.21) | 0.56 | 5.14 | 4.58 |

(1) "A" denotes the sulfur trioxide sorption step, "D" the sulfur trioxide desorption step.
(2) Weight gain or loss as % of Starting Weight (losses shown in parentheses).
(3) Weight gain or loss as % of Final Weight (losses shown in parentheses).
(4) Percent thermogravimetric analysis (TGA) weight loss was measured and is shown in two temperature ranges, ambient to 350° C. (operating range for the invention) and 350–750° C, (for complete removal of all sulfur trioxide).
(5) Cycle averages were:
Average sulfur trioxide loading: 14.12 ± 5.82%
Average sulfur trioxide delivered: 12.48 ± 4.63%
(6) As indicated above, the apparent temporary low capacity in recyle runs 4–6 in Example 21 are due to temperature excursions.

The results in Table 2 illustrate the capacity for repeated sorption and desorption cycles and demonstrate the stability of the H-ZSM-5 extrudate to such cycles.

Comparative Example A

A 20 g sample of alumina (Al-3945, 1/12" extrudates, Lot 4, 0537–178, Harshaw Corp., Beechwood Ohio) was placed in a quartz tube in a vertically mounted tube furnace, heated by raising the temperature 60° C. per hour to 500° C. and holding at 500° C. for 5 hours under flowing nitrogen. A poly(tetrafluoroethylene) vessel containing 1.00 g dried alumina was heated to about 59° C. and distilled sulfur trioxide vapor (about 44° C.) was purged over the solid for 1.25 hours. The solid was then heated to 74° C. under a dry nitrogen purge for 3.8 h to remove surface bound sulfur trioxide. The final weight of the alumina/sulfur trioxide complex was 1.67 g (67% weight gain, 39.12% sulfur trioxide loading). The alumina/sulfur trioxide complex was then transferred under anhydrous conditions to the thermogravimetric analysis where the average weight loss was 4.03% of its weight between room temperature and 350° C. and 21.98% between room temperature and 750° C. Comparative Example A demonstrated the unsuitability of alumina in the practice of this invention.

What is claimed is:

1. A process for reversible sorption of sulfur troxide onto a sorbent comprising a) at a site equipped for handling bulk quantities of sulfur trioxide contacting from about 15% to 100% sulfur trioxide in an inert gas with the sorbent under anhydrous conditions at a temperature of from about 35° C. to about 150° C. thereby sorbing the sulfur trioxide onto the sorbent which sorbent is then capable of storage, and transporting said sorbent in a container to a site requiring delivery of sulfur trioxide, b) at said site requiring delivery desorbing sulfur trioxide from the sorbent at a temperature of from about 150° C. to about 350° C. at about atmospheric pressure, or under a vacuum pressure, and transporting said sorbent to said site for handling bulk quantities of sulfur trioxide, and c) recycling said sorben by continuously repeating steps a) and b), wherein said sorbent has structural stability upon recycle, a pore size of at least 0.5 nm, and consists essentially of silica or zeolite, said zeolite having a silicon to aluminum ratio equal to about 15, or greater.

2. The process of claim 1 wherein the sulfur trioxide sorbed and desorbed is of purity of from about 99% to 100%.

3. The process of claim 2, wherein the sulfur trioxide is of a purity of at least 99.9%.

4. The process of claim 1 wherein the sorbent has sorbed thereon from about 3% to about 60% by weight sulfur trioxide.

5. The process of claim 1 wherein the sulfur trioxide is sorbed onto the sorbent at a temperature of from about 50° C. to about 125° C.

6. The process of claim 1 wherein the sorbent is a silica or a zeolite, wherein said zeolite has a silicon to aluminum ratio of at least 25.

7. A sorbent consisting essentially of silica or zeolite, said zeolite having a silicon to aluminum ratio equal to about 15, or greater, said sorbent having a pore size of at least 0.5 nm, and having adsorbed thereon a minimum of about 1% by weight sulfur trioxide.

8. The sorbent of claim 7 which is a zeolite having a silicon to aluminum ratio of at least 25.

9. The sorbent of claim 7 in a pelletized, beaded or chopped form.

* * * * *